Nov. 3, 1970 J. E. RILEY 3,538,395
SOLID ELECTROLYTE CAPACITOR AND METHOD FOR MAKING SAME
Filed March 12, 1968 3 Sheets-Sheet 1

INVENTOR
JAMES E. RILEY
BY Leo A. Plumb, Jr.
ATTORNEY 3,538,395
SOLID ELECTROLYTE CAPACITOR AND METHOD FOR MAKING SAME
James E. Riley, Greenville, S.C., assignor to Union Carbide Corporation, a corporation of New York
Filed Mar. 12, 1968, Ser. No. 712,414
Int. Cl. H01g 9/00, 13/00
U.S. Cl. 317—230
18 Claims

ABSTRACT OF THE DISCLOSURE

A solid electrolytic capacitor and method for the production thereof comprising a porous anode body formed of sintered particles of an anadizable metal, a dielectric oxide film formed on the exposed surfaces of said particles, an electrolyte layer of manganese dioxide covering the dielectric oxide film in the pores and on the surface of the anode body, and an additional solid composite coating covering the electrolyte layer on the surface of the body, said composite coating comprising solid manganese dioxide particles bonded together and to the electrolyte layer by converted in situ manganese dioxide reaction product from the pyrolysis of the manganous nitrate content of a slurry applied to the surface of the body and comprising the solid manganese dioxide particles suspended in manganous nitrate solution. The solid composite coating forms a mechanically strong, adherent, electrically conductive coating which protects the dielectric oxide film from damage due to stresses resulting from physical abuse, thermal cycling, other high mechanical and electrical stress conditions to which the capacitor is subjected.

---

Figure 1:
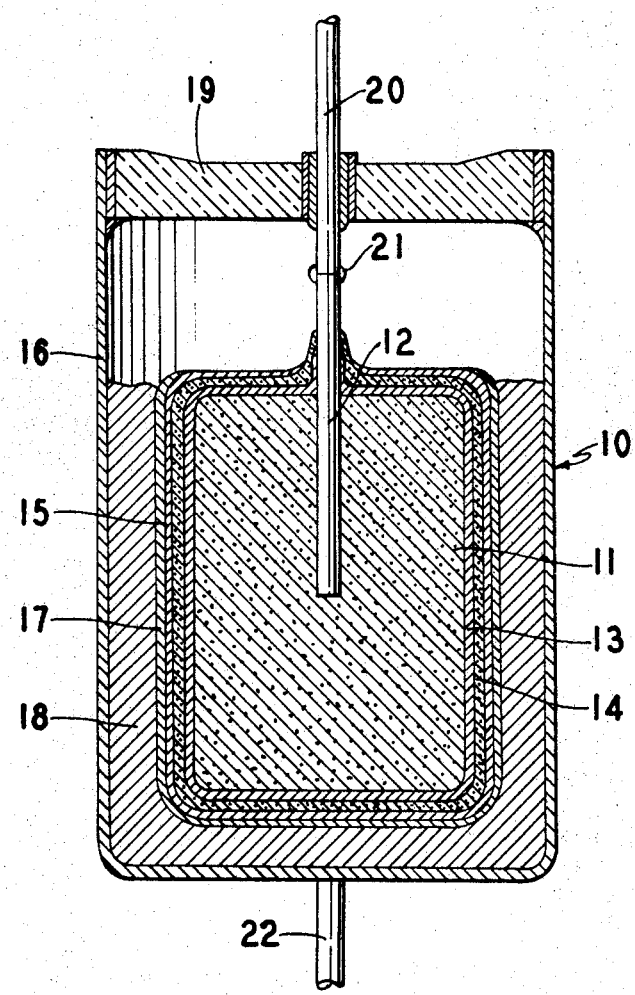

Solid tantalum electrolytic capacitors have many attributes over other types of electrolytic capacitors, including for example, small size, low leakage levels, low impedance, high reliability, dry hermetic construction, and long shelf life.

The large scale production of solid tantalum electrolytic capacitors of uniformly high quality is difficult however, as suggested by the following listing of the process steps involved, many of which are of major importance in the production of a useful device:

(1) tantalum powder pressing and sintering to form a porous anode plug
(2) anodization of the tantalum plug to form an oxidic dielectric layer
(3) electrolyte impregnation and pyrolysis
(4) dielectric and electrolyte reformation
(5) counterelectrode application
(6) encapsulation of the finished capacitor
(7) temperature cycling, aging and life testing
(8) parametric testing and sorting While all of the above steps must be performed to stringent requirements, step number 3 relating to electrolyte impregnation is particularly important for many of the failures of solid tantalum electrolytic capacitors are associated with the solid electrolyte coating. Basically, the impergnation process consists of the in-situ deposition of semiconductor manganese dioxide ($MnO_2$) on the internal and external surfaces of the anodized tantalum body. The process of impregnating the anode is usually practiced by repeatedly immersing the porous body in an aqueous solution of manganous nitrate,

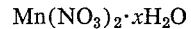

and then performing a pyrolytic conversion at an elevated temperature between 150° C. and 450° C., whereby the following reaction occurs:

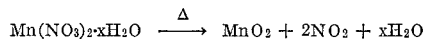

The impregnation process of immersing the anode in the manganous nitrate solution followed by pyrolysis is repeated several times until the pores of the porous metal anode are impregnated with the $MnO_2$ pyrolysis reaction product. A reformation step, i.e., placing the impregnated anode back into a liquid electrolyte to anodically heal any imperfections in the $Ta_2O_5$ dielectric film which may arise from the impregnation step, can be performed at some point in the sequence of impregnation steps and a final reformation is generally performed after the completion of all of the impregnations.

While not being limited by any thoery, it is believed that the pyrolytically converted $MnO_2$ deposited on the exposed interior and exterior surfaces of the porous anode forms a solid electrolyte which separates the filmed anode and the later deposited cathodic coating and prevents short circuits between the anode and cathode through any minute imperfections which may exist in the oxide film. The $MnO_2$ serves to reoxidize and heal the oxide in case of a local breakdown or puncture in the film.

As a result of the repeated impregnations, the $MnO_2$ tends to fill the pores of the plug and to accumulate as a coating on the outside of the anode. This exterior coating of $MnO_2$ has been recognized as important in providing protection to the delicate anodic $Ta_2O_5$ dielectric layer from physical and environmental abuse. Damage can occur to the anode from any one of the following sources: from the subsequently performed processing steps for forming the counterelectrode; from the encapsulation process, where hot solder is used to anchor the anode in position in a metallic container; during transfer molding, where the capacitor is encapsulated under high pressure in epoxy; as a result of the physical stresses experienced during extreme temperature cycling; during any of the handling steps or due to physical abuse or environmental extremes during actual use.

Unfortunately, the accumulation of $MnO_2$ on the exterior of an anode due to the impregnation steps is often soft, porous, friable, non-uniform in terms of thickness and coverage, and easily crushed and broken away from the anode. Presently produced solid electrolytic capacitors are often not provided with sufficient protection from the many sources of physical abuse to which they are subjected during manufacture and use. As a result there are a large number of capacitors produced which are defective and must be rejected.

It is the primary object of this invention therefore to provide a method for producing solid electrolytic capacitors having good physical protection of the anode and its $Ta_2O_5$ coating from mechanical shock or stress.

It is also an object of this invention to provide a method for forming on a solid electrolytic capacitor anode a mechanically strong, adherent and electrically conductive coating.

Other aims and advantages of this invention will be apparent from the following description, the appended claims and the attached drawings.

According to the present invention a process is provided for producing solid electrolytic capacitors which comprises providing a porous tantalum body in which the tantalum surface has an in-situ formed coating of tantalum oxide, impregnating the porous body with a solution of a manganese salt decomposable upon heating to manganese dioxide and heating the impregnated anode at a temperature of from about 150° C. to 450° C. and generally at from about 250° C. to 400° C. to convert the solution to manganese dioxide, immersing the manganese dioxide impregnated anode in a slurry of solid manganese dioxide particles suspended in an aqueous solution of manganous nitrate to form a coating of said slurry on said anode, and heating said slurry coated anode to dry said slurry on the anode and to pyrolize the manganous nitrate content thereof to form on said anode a mechanically strong, adherent, electrically conductive solid composite coating of uniform thickness consisting of the solid manganese dioxide particles bonded together and to the anode by the manganese dioxide pyrolyzed from the solution, and depositing a conductive coating upon said coated anode. The slurry dipped anode can be fired at temperatures from about 150° C. to 450° C. and preferably at from 250° C. to 400° C.

In order to form the solid composite protective coating on the anode with a uniform thickness it is useful to utilize a slurry having particular flow behavior properties. The solid manganese dioxide particle-aqueous manganous nitrate solution slurry should have a non-ideal plastic viscosity behavior, i.e., by a "Casson substance" and have a "flow limit" whereby an anode dipped in the slurry will be uniformly coated with the slurry, which will additionally be retained on the anode during subsequent handling, drying and pyrolysis treatments to provide a uniformly thick composite coating on the anode.

After the slurry coated anode is pyrolyzed it may be immersed again in an aqueous solution of manganous nitrate and then the layer of manganous nitrate prolyzed to form a layer of soft porous manganese oxide over the hard substantially impervious composite coating produced by the slurry. The thin outer layer of soft porous manganese dioxide provides for better adhesion of the subsequently deposited conductive coatings, for example a carbon coating, while the underlying hard non-porous composite coating provides the needed protection to the anode and its dielectric film.

In the drawings:

FIG. 1 is a vertical cross section of a solid electrolytic capacitor showing the composite coating produced by the process of this invention.

Figure 2:
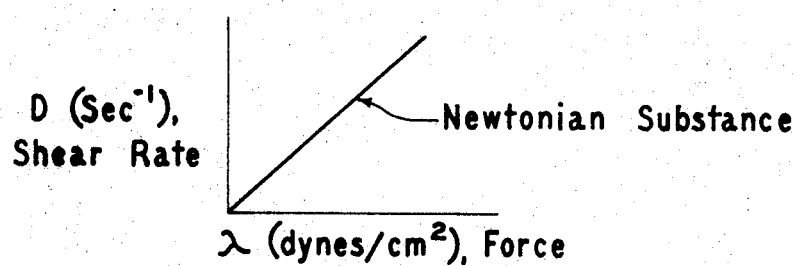
Figure 2:
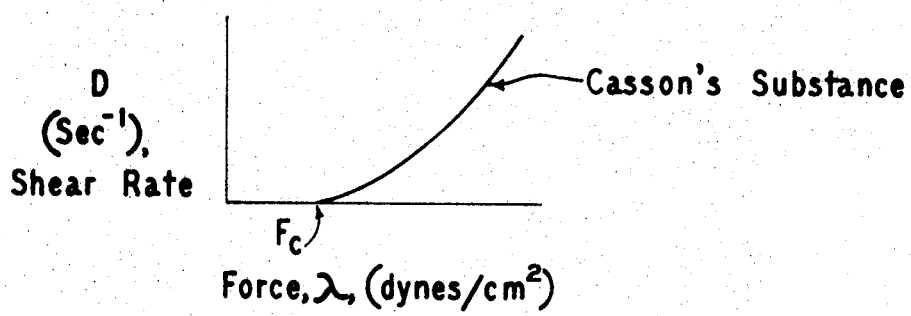

FIGS. 2(a) and (b) are graphical representations of the flow behavior properties of a Newtonian material (a) and a Casson's substance (b).

Figure 3:
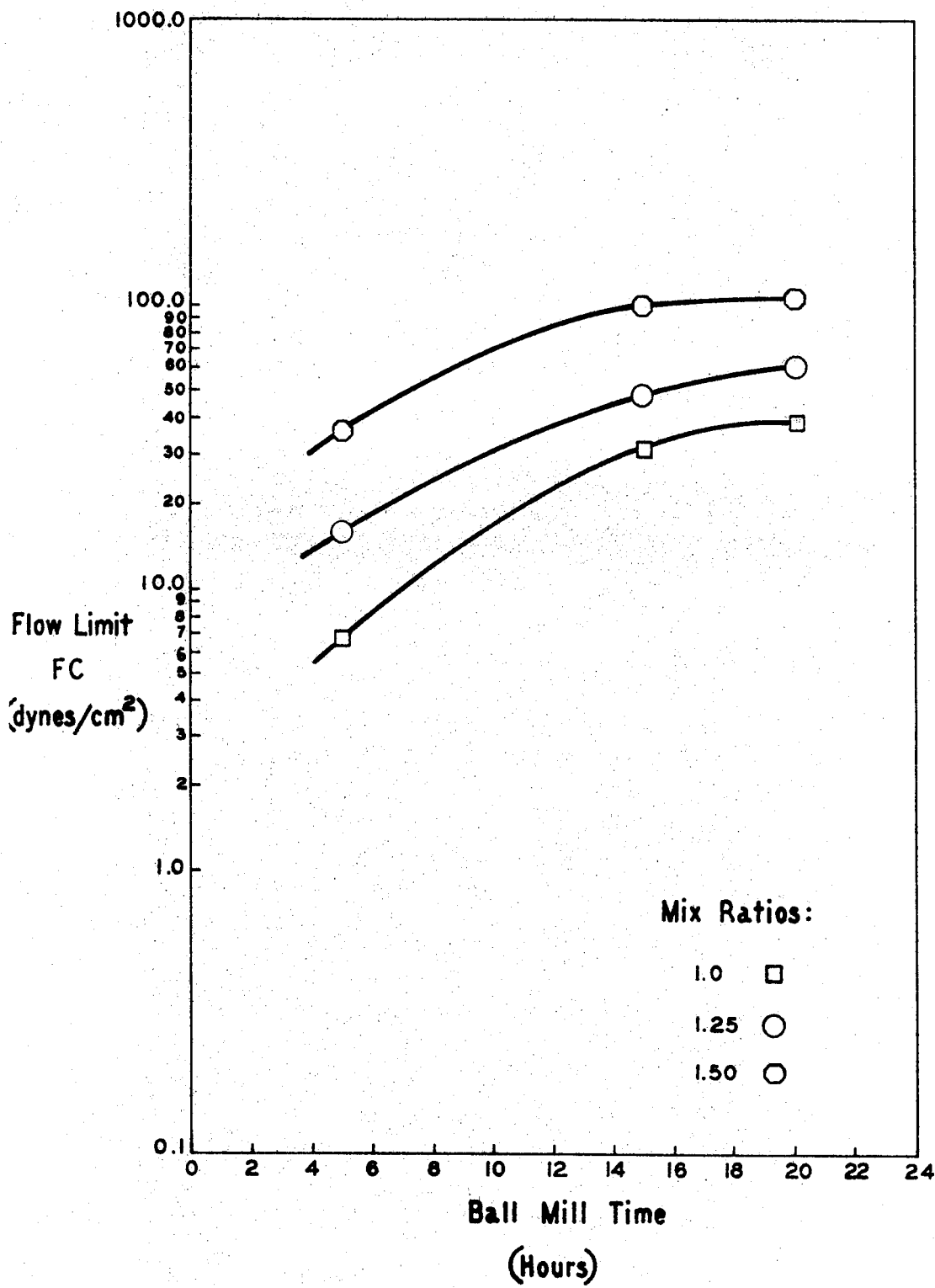

FIG. 3 is a graphical representation showing the "flow limit" properties of a particularly useful slurry as a function of MnO' particle grinding time.

Referring to FIG. 1 there is represented a solid electrolytic capacitor 10 having an anode 11 preferably of tantalum, but capable of being any metal which forms an insulating oxide film, for example, aluminum, tungsten, columbium, hafnium, titanium and zirconium. The anode 11 is formed by compacting tantalum powder around an embedded tantalum lead wire 12 sintering the compact at about 2000° C. in a vacuum furnace to form a physically strong porous tantalum body. The body 11 is then anodized by well known techniques, for example, in a bath to form an oxide film 13 on the exposed surfaces of the porous body. The interior of the porous body is not shown for ease of illustration but is understood that the internal surfaces of the pores have an oxide film formed thereover.

The oxide film 13 may not be completely continuous and in fact may contain faults and punctures which are due to the presence of impurities or to stresses accompanying physical and thermal shocks. Leakage currents would normally flow through any such holes in the oxide dielectric were it not for the presence of manganese dioxide electrolyte over the oxide film 13. The manganese dioxide has the property of "healing" any faults in the tantalum oxide since the manganese dioxide, which is electrically conductive, is believed to be reduced to other non-conductive oxides by the heating associated with any leakage current at a fault site, thereby reducing the leakage current. The manganese dioxide substantially fills the pores of the body and covers the dielectric oxide film. This manganese dioxide filling is produced, as is well known in the art, by impregnating the oxide filmed anode with a solution of a manganese salt decomposable upon heating to form manganese oxide, and then heating the impregnated anode at a temperature of from about 150° C. to 450° C. to pyrolyze the nitrate and convert it to manganese dioxide.

In one preferred form of this invention the manganous nitrate impregnated anode is pyrolyzed in an atmosphere consisting of a mixture of steam and air whereby a more complete filling of pores of the anode with manganese dioxide results.

The impregnation of the anode can be repeated several times, and is followed by a pyrolysis heating after each impregnation.

After the impregnations and pyrolysis treatments, the anode is dipped in the slurry of solid manganese dioxide particles suspended in manganous nitrate solution. The slurry coated anode is then heated to dry the anode and pyrolyze the manganous nitrate content of the slurry to form on the anode a composite coating 14 consisting of the solid manganese dioxide particles bonded together and to the anode by the manganese dioxide pyrolyzed from the manganous nitrate solution. The step of dipping the anode in the slurry followed by drying and pyrolysis may be repeated to increase the thickness of the composite coating if desired.

As an example of the practice of the invention, the following description is set out to show the method of producing a particularly useful slurry.

This slurry is made by first dry ball milling manganese dioxide, preferably of reagent or capacitor grade, to a partially collodial state. The equipment can be, for example, a 3.4 gallon porcelain jar, with an addition of 10 lbs. of MnO₂ and using from 10 to 20 lbs. of ½″ by ½″ alumina cylinders as the grinding media. The grinding is carried on for a period of time sufficient to impart a particular flow property to the resultant slurry as set out hereafter.

After grinding, the finely divided manganese dioxide is combined with an aqueous solution of manganous nitrate, preferably having a specific gravity of 1.70 at 25° C. The manganese dioxide may simply be mixed with the manganous nitrate solution using a paint stirrer.

The following weight ratios of MnO₂ to

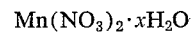

have been found particularly suitable for use as slurries: 1 to 1, 1.25 to 1, and 1.50 to 1. Other ratios may be used provided the slurry has the flow properties described hereinafter.

After mixing, the slurry is heated to 50° C. and is preferably maintained at this temperature during use and storage to assist in preventing settling of the MnO₂ particles.

The anodes are slowly dipped in the heated slurry until the slurry rises to a desired coating level on the anode, generally over the top of the anode and touching the lead wire 12. The anode is then slowly withdrawn from the slurry.

After the anodes are dipped in the slurry, the manganous nitrate component is thermally converted into manganese dioxide to form a continuous solid matrix with the manganese dioxide particles already present. This is accomplished by heating the anode at about 250° C. preferably in a step-wise procedure as follows:

(1) a drying step at about 40° to 50° C. for from 5 to 10 minutes
(2) a gradual increase in temperature from about 50° C. to about 150° C. in from 15 to 20 minutes
(3) a pre-fire heating at about 150° C. for about 10 minutes
(4) a conversion heating at about 250° C. for from 3 to 7 minutes.

The conversion heating of the slurry coated anode is preferably performed in an oven having a recirculated air-steam mixture atmosphere.

It is important that the composite coating produced on the anode be of a substantially uniform thickness and be free of excessive manganese dioxide protrusions which would interfere with the fitting of the anode into its case. The attainment of a uniformly thick composite coating after pyrolytic heating requires that the unified slurry coating have been maintained on the anode as a coating of substantially uniform thickness during the period following dipping and throughout the entire heating cycle. The slurries described herein have this property of remaining on the dipped anode as a coating of substantially uniform thickness during all of the handling and heating steps performed subsequent to the dipping.

The slurries of this invention can be manufactured to have the flow behavior properties typical of a "Casson's" substance, which is a term of the art defining a certain pattern of rheological behavior. A Casson's substance is characterized by two basic flow parameters:

$\eta_c$ = The Casson or plastic viscosity (in centipoise)
$F_c$ = Flow limit (dynes/cm.$^2$)

Plastic viscosity, $\eta_c$, is a different type of flow behavior than that represented by the viscosity $\eta$ of a Newtonian material, which is represented in FIG. 2(a) and is given as:

$$\eta = \lambda/D$$

A Newtonian material, e.g. water, most oils and other common liquids, has a viscosity ($\eta$) which remains constant. In other words the force, $\lambda$ (dynes/cm.$^2$), or drag exerted upon a spindle rotating in a Newtonian substance increases linearly as the shearing rate D(sec.$^{-1}$), or number of spindle revolutions per minute, increases. This relationship is represented in FIG. 2(a). The viscosity, $\eta$, of such a material remains constant regardless of shear rate. When an anode is dipped into such a material, the layer of liquid adhering to the sides of the anode will start to drop off the anode when it is removed from the bath and will continue to flow during subsequent handling. Merely increasing the viscosity of the liquid will not prevent the eventual movement of the adhering layer due to gravity and makes it more difficult to achieve uniform coating of the anode in the overly viscose material.

A slurry having the flow behavior properties of a Casson's substance has a different rheological behavior than that described above however. This slurry has a viscosity $\eta_c$ which decreases with an increase in shearing rate, as represented by the following relationship:

$$\eta_c = \frac{(\sqrt{\lambda} - \sqrt{F_c})^2}{D_c}$$

wherein $\lambda$ is the force in dynes/cm.$^2$; $D_c$ is the shear rate (sec.$^{-1}$) of the rotating spindle in the Casson's type slurry; and wherein $F_c$ is the flow limit (dynes/cm.$^2$) and which represents the force which must be applied to the material to initiate flow. For values below $F_c$, the material acts essentially as a solid, i.e., does not readily flow and may be formed. FIG. 2(b) shows the relationship from which the equation given above for $\eta_c$ is derived.

The presence of a flow limit $F_c$ is the reason why the slurry will coat an anode surface in a substantially uniform manner. As the dipped anode is shearing through the slurry, the flow limit, $F_c$, is overcome, and the slurry flows onto the anode. After the anode is removed from the slurry, this shearing force is reduced to zero, and the resultant coating acts essentially as a solid, resisting further flow. The slurry remains on the anode as a layer of substantially uniform thickness during all subsequent handling and heating steps with the result that the solid composite coating produced by pyrolysis is of a substantially uniform thickness.

The slurry of $MnO_2$ particles in $Mn(NO_3)_2 \cdot xH_2O$ solution can be made to have the above noted properties by grinding the $MnO_2$ to a degree of fineness which, when the resulting $MnO_2$ powder is mixed in weight ratios of from about 1:1 to 1.5:1 of $MnO_2$ to $Mn(NO_3)_2 \cdot xH_2O$ with manganous nitrate solution having a specific gravity of about 1.7, will exhibit a plastic viscosity flow behavior pattern, i.e. will decrease in viscosity with increasing shear rate, and which will have a definite flow limit, $F_c$, below which the material acts essentially as a solid, i.e., will not readily flow. The value of the flow limit, $F_c$, for a particular slurry is determined by measuring with a viscometer the plastic viscosity $\eta_c$ of the slurry at the point at which the slurry starts to flow and recording the shear rate $D_c$. From this data the value of $F_c$ for that particular slurry may be calculated using the formula given above for $\eta_c$ or by using a Casson nomogram.

FIG. 3 shows the values of $F_c$ for a number of slurry samples made from $MnO_2$ powder samples produced by grinding in a ball mill for various periods of time. The various $MnO_2$ powder samples were ground in a ball mill of the type previously described loaded with 10 lbs. of $MnO_2$ and 20 lbs. of cylinders. Slurry samples were made from the $MnO_2$ powder ground for the indicated number of hours by mixing the powder with $Mn(NO_3)_2 \cdot xH_2O$ at 1.7 s.g. in weight ratios of 1 to 1, 1.25 to 1, and 1.5 to 1. The flow limit $F_c$ of each slurry was determined and plotted. This plot can serve as a calibration curve for that particular grinding mill set up and a slurry of any desired $F_c$ and weight ratio can be produced by grinding the $MnO_2$ powder for the indicated number of hours. Slurries having flow limits other than those shown in FIG. 3 are also useful in the process of this invention.

Calibration curves for the other grinding mill conditions or for different loadings of $MnO_2$ charge and grinding media can be made as needed. Additionally, if different weight ratios of $MnO_2$ to $Mn(NO_3)_2 \cdot xH_2O$ are to be used or a nitrate solution of other than the preferred 1.7 s.g. is used, then the values of the flow limits, $F_c$, obtained with such slurries are determined and plotted to make a calibration curve. Slurries having the desired $F_c$ are then made by reference to the calibration curve to determine the necessary grinding time.

It is to be understood that slurries having the desirable Casson's flow behavior characteristics can be obtained in ways other than the specific manner described above. The flow properties of a substance depend upon such variables as the size, shape, surface area and density of the solid $MnO_2$ particles, as well as the methods and conditions of producing the solid particles; the weight ratios of solid particles to liquid; and the ionic concentration and temperature of the liquid phase. These characteristics can be varied by any method provided that the resultant slurry has the flow characteristics described herein.

The thickness of the slurry coating on the anode can be controlled by the selection of a slurry having an appropriate flow limit. The table below shows the thickness of the coating produced on impregnated anodes with a slurry having a 1.5 to 1 weight ratio and the flow limit values shown:

| Anode group | Flow limit, $F_c$ (dynes/cm.²) | Approx. coating thickness (mils) |
|---|---|---|
| A | 8.56 | 5.8 |
| B | 29.01 | 9.9 |
| C | 55.42 | 12.4 |
| D | 105.1 | 23.0 |
| E | 173.7 | 25.5 |

After the solid composite coating is produced by firing the slurry dipped anode, the anode is given a final reformation treatment in an electrolytic bath to heal any defects. The anode may then be given a conductive coating 15 by dipping it in a solution of finely divided carbon, e.g., an Aquadag solution. If the solid composite coating is found to be so dense and impervious as to not present a good surface for the deposition of the carbon coating, then a manganous nitrate dip and firing may be performed after the slurry coating and prior to final reformation. The outer surface of the anode will then be soft and porous and will readily accept the carbon deposit while the underlying solid composite coating will provide the protection against damage to the $Ta_2O_5$ film.

The carbon coated anode may then be given a coating of silver paint, which is cured by baking, and then solder coated and finally either encapsulated in plastic or in a hermetically sealed can 16. The preferred method for sealing the anode in a can is to dip the silver painted and cured anode into hot, liquid solder to form a solder coating 17, and then to place the solder-coated anode in a can containing hot, liquid, flux-free solder 18. On cooling, the anode will be firmly anchored in the can 16. The hermetic seal 19 is then formed around the lead wire 20, which is generally a length of nickel wire welded 21 to the end of the tantalum lead wire. The can 16 can serve as the capacitor cathode or a cathode lead wire 22 can be soldered to the can.

The solid composite coating produced by the process of this invention is denser, stronger and more impervious than the coatings formed on anodes by repeated dippings in managnous nitrate solutions. The solid composite coating is more uniform and can be formed in different thicknesses to afford whatever degree of protection is required. The presence of the solid composite coating increases the protection of the anode against physical damage often encountered in normal capacitor manufacturing, e.g.: in cutting the anodes from the holding bars; in welding the nickel lead wire 20 to the tantalum lead wire 12 of the anode; in soldering of the anode into the can; and from direct contact of solder coatings 17 and 18 itself through voids in the $MnO_2$ coating. Additionally, the solid composite coating decreases the number of device failures due to the thermal stresses resulting from temperature cycling. As a result of the use of the solid composite coating described herein, an increased yield of useful capacitors can generally be obtained.

What is claimed is:

1. The process for producing solid electrolytic capacitors which comprises forming a porous body of sintered anodizable metal particles having a continuous dielectric anodized oxide film over the surface of said particles, impregnating the porous body with a solution of a manganese salt convertible upon heating to manganese dioxide and heating the impregnated anode to convert the solution material to manganese dioxide, immersing the manganese doxide impregnated anode in a slurry composed of an aqueous solution of manganous nitrate having solid manganese dioxide particles suspended therein to form a coating of said slurry on said anode, and heating said slurry coated anode to dry said slurry on the anode and to pyrolyze the manganous nitrate content thereof to form on said anode a mechanically strong, adherent and electrically semi-conductive, solid composite coating of substantially uniform thickness consisting of the solid manganese dioxide particles and the product of the in situ pyrolyzed manganous nitrate, whereby said pyrolyzed product bonds said solid manganese dioxide to the surface of said body, and depositing a conductive electrode coating over the surface of said composite coating.

2. The process of claim 1 in which the slurry exhibits a decrease in viscosity during immersion of the anode in the slurry and possesses flow limit characteristics when formed as a coating on the anode after removal from the slurry whereby the so-formed slurry coating acts essentially as a solid and resists further flow to remain as a substantially uniform coating on the anode.

3. The process of claim 1 in which the step of impregnating the porous body with a solution of a manganese salt followed by pyrolysis is repeated at least several times and in which the partially impregnated body is reformed in a liquid electrolyte to heal any imperfections in the dielectric oxide film.

4. The process of claim 1 in which the pyrolysis heating of the manganous nitrate dipped anode and the slurry dipped anode is conducted at a temperature of from about 150° C. to 450° C.

5. The process of claim 1 in which the slurry dipped and pyrolyzed body is again reformed in a liquid electrolyte to heal any imperfections in the tantalum oxide.

6. The process of claim 1 in which the slurry dipped and pyrolyzed body is immersed at least one additional time in an aqueous solution of manganous nitrate followed by pyrolysis and then followed by a reformation in a liquid electrolyte.

7. The process of claim 1 in which the slurry dipped anode is heated at a temperature of from about 250° C. to 400° C. to pyrolyze the manganous nitrate content of the slurry.

8. The process of claim 7 in which the heating of the slurry dipped anode is performed in an atmosphere composed of air and steam.

9. The process of claim 2 in which the slurry is composed of $MnO_2$ particles suspended in manganous nitrate solution in weight ratios of $MnO_2$ to $Mn(NO_3)_2 \cdot xH_2O$ of from 1:1 to 1.5:1.

10. The process of claim 9 in which the manganous nitrate solution has a specific gravity of about 1.7 at a temperature of 25° C.

11. The process of claim 9 in which the slurry is maintained at a temperature of about 50° C. when the anode is dipped therein.

12. The process of claim 9 in which the slurry dipped anode is dried at a temperature of about 40 to 50° C. prior to being pyrolyzed at a temperature of about 250° C.

13. The process of claim 10 in which the slurry dipped anode is first dried at a temperature of about 40 to 50° C., and then gradually heated to 150° C. and maintained at that temperature for about 10 minutes, and then pyrolyzed at a temperature of about 250° C.

14. A solid electrolytic capacitor comprising in combination a porous anode body formed of sintered particles of an anodizable metal; a dielectric oxide film formed on the exposed surfaces of said particles; an electrolyte layer of manganese dioxide covering the surface of the dielectric oxide film in the pores and on the surface of the anode body; an additional solid composite coating covering the electrolyte layer on the surface of the anode body, said composite coating comprising solid manganese dioxide particles bonded together and to the electrolyte layer, said coating being the composite manganese dioxide product of a slurry consisting of solid manganese dioxide particles suspended in a manganous nitrate solution applied to the electrolyte layer surface and in situ heat converted, and an electrically conductive cathode layer on the surface of the solid composite coating.

15. The solid electrolytic capacitor of claim 14 in which the anodizable metal is tantalum.

16. The solid electrolytic capacitor of claim 15 in which the electrically conductive cathode layer comprises powdered carbon covered with a layer of silver paint.

17. The solid electrolytic capacitor of claim 16 in which a layer of solder covers the cathode layer.

18. The process of claim 1 in which the porous body is composed of tantalum.

References Cited

UNITED STATES PATENTS

| | | | |
|---|---|---|---|
| 3,054,029 | 9/1962 | Wagner et al. | 317—230 |
| 3,241,008 | 3/1966 | Komisarek | 317—230 |
| 3,299,325 | 1/1967 | Wagener et al. | 317—230 |
| 3,302,074 | 1/1967 | Black | 317—230 |
| 3,320,494 | 5/1967 | Riley | 317—230 |
| 3,337,429 | 8/1967 | Zind | 317—230 |

JAMES D. KALLAM, Primary Examiner

U.S. Cl. X.R.

29—570